United States Patent
Salamon et al.

(10) Patent No.: US 9,588,925 B2
(45) Date of Patent: Mar. 7, 2017

(54) USB EXTENSION FOR LOSSY CHANNEL

(71) Applicant: Valens Semiconductor Ltd., Hod Hasharon (IL)

(72) Inventors: Aviv Salamon, Raanana (IL); Eyran Lida, Kfar Ha-Oranim (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 414 days.

(21) Appl. No.: 14/488,388

(22) Filed: Sep. 17, 2014

(65) Prior Publication Data
US 2016/0077992 A1    Mar. 17, 2016

(51) Int. Cl.
*G06F 13/20* (2006.01)
*G06F 13/40* (2006.01)
*G06F 13/42* (2006.01)
*G06F 13/38* (2006.01)

(52) U.S. Cl.
CPC ........ *G06F 13/4022* (2013.01); *G06F 13/385* (2013.01); *G06F 13/4282* (2013.01)

(58) Field of Classification Search
USPC .............. 710/305–315, 104–108, 300–304
See application file for complete search history.

(56) References Cited

U.S. PATENT DOCUMENTS

| | | | | |
|---|---|---|---|---|
| 6,184,936 B1 * | 2/2001 | Hu | ................... | G06T 11/001 348/391.1 |
| 7,418,524 B2 * | 8/2008 | Beasley | ............... | G06F 13/4045 710/2 |
| 7,761,645 B2 * | 7/2010 | Monks | ................... | G06F 13/426 710/313 |
| 7,930,446 B2 * | 4/2011 | Kesselman | ......... | H04L 12/5695 370/392 |
| 8,185,682 B2 * | 5/2012 | Bandholz | ............ | G06F 13/4072 710/17 |
| 8,200,858 B1 * | 6/2012 | Shor | ................. | H04L 12/40032 710/2 |
| 8,489,136 B2 * | 7/2013 | Banks | ................... | H04L 1/0015 455/127.1 |
| 8,578,060 B2 | 11/2013 | Lida et al. | | |
| 2002/0010821 A1 * | 1/2002 | Yu | ....................... | G06F 13/4045 710/100 |
| 2011/0047303 A1 * | 2/2011 | Saito | ....................... | G06F 3/061 710/39 |
| 2016/0267037 A1 * | 9/2016 | Kim | ...................... | G06F 13/385 |

OTHER PUBLICATIONS

Universal Serial Bus Specification, Revision 2.0, Apr. 27, 2000.

* cited by examiner

*Primary Examiner* — Raymond Phan
(74) *Attorney, Agent, or Firm* — Active Knowledge Ltd.

(57) ABSTRACT

Methods and systems for operating a USB extension over a lossy channel. The USB extension includes at least a state machine and packet loss inference mechanism. The state machine includes a first state in which the USB extension receives a USB data packet from a standard USB host, a second state, unsupported by the USB Specification, in which the packet loss inference mechanism may indicate the state machine to switch back to its first state, and a third state in which the USB extension switches the state machine back to its first state.

27 Claims, 4 Drawing Sheets

USB EXTENSION FOR LOSSY CHANNEL

BACKGROUND

Universal Serial Bus (USB) is an industry standard that defines the cables, connectors and communications protocols used in a bus for connection, communication, and power supply between computers and electronic devices.

The USB Specification, by the USB Implementers Forum, defines various high speed USB transactions, such as High Speed Bulk Transactions, High Speed Isochronous Transfers, High Speed Interrupt Transactions, High Speed Control Transfers, Split Transactions, Split Bulk OUT Transaction, Split Bulk IN Transaction, Periodic Split Transactions, Split Interrupt OUT Transaction, Split Interrupt IN Transaction, Split Isochronous OUT Transaction, and Split Isochronous IN Transaction. The various transactions operate according to various state machines, which in some cases are inadequate for USB extensions.

BRIEF SUMMARY

In one embodiment, a USB extension includes at least a state machine and packet loss inference mechanism. The state machine includes a first state in which the USB extension receives a USB IN token from a standard USB host, a second state, unsupported by the USB Specification, in which the packet loss inference mechanism may indicate the state machine to switch back to its first state, and a third state in which the USB extension switches the state machine back to its first state.

In another embodiment, a USB extension includes at least a state machine and packet loss inference mechanism. The state machine includes a first state in which the USB extension receives a USB data packet from a standard USB host, a second state, unsupported by the USB Specification, in which the packet loss inference mechanism may indicate the state machine to switch back to its first state, and a third state in which the USB extension switches the state machine back to its first state.

BRIEF DESCRIPTION OF THE DRAWINGS

The embodiments are herein described, by way of example only, with reference to the accompanying drawings. In the drawings.

DETAILED DESCRIPTION

Figure 1:
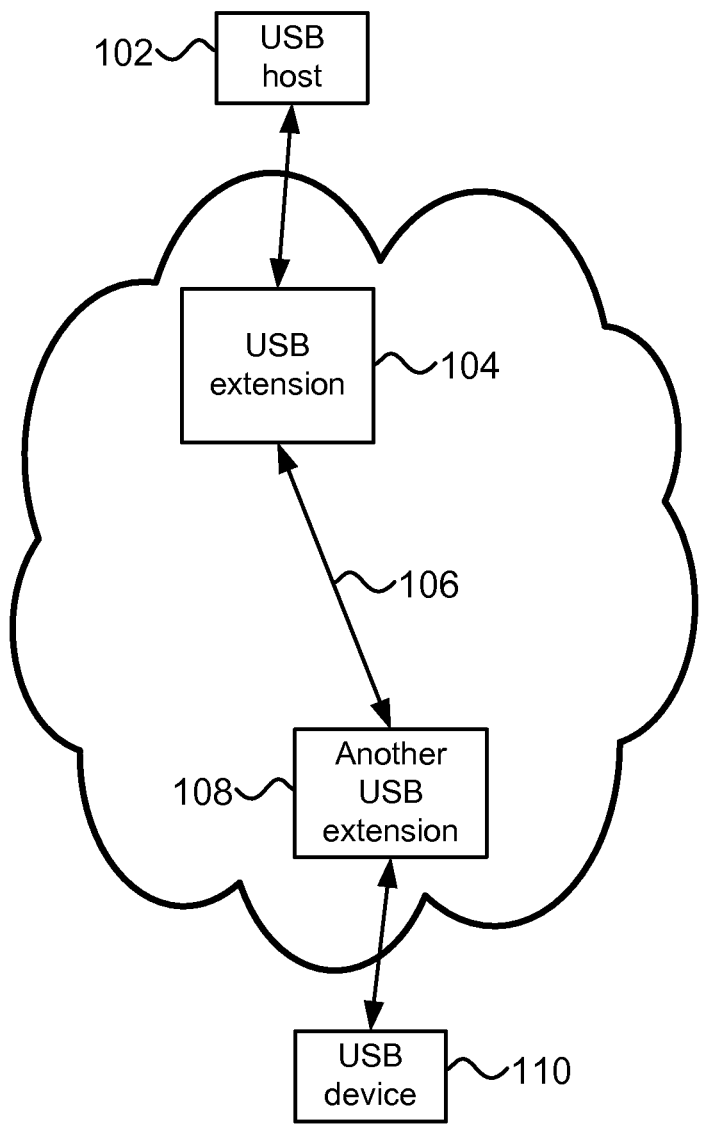
FIG. 1 illustrates one embodiment of a USB extension designed for a lossy channel.
Figure 2:
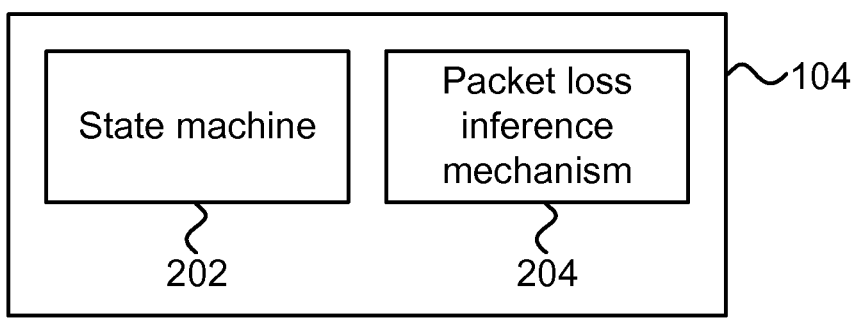
FIG. 2 illustrates one embodiment of a USB extension designed for a lossy channel.

FIG. 1 and FIG. 2 illustrate one embodiment of a Universal Serial Bus (USB) extension designed for a lossy channel. The USB extension 104 communicates with another USB extension 108 over a lossy communication channel 106, also referred to as lossy channel. The USB extension 104 includes at least a state machine 202 and packet loss inference mechanism 204.

The state machine 202 includes first, second and third states for the USB extension 104.

The packet loss inference mechanism 204 identifies loss of at least one of a USB IN token or a reply to the USB IN token, and is capable of indicating the state machine to switch to the first state.

The lossy channel 106 is characterized by a packet loss ratio higher than zero. The lossy channel 106 may operate according to the USB standard or according to a protocol incompatible with the USB standard. The lossy channel 106 may be longer than 30 meters, and may allow the distance between adjacent hubs to be longer than 5 meters.

When the state machine is in its first state, the USB extension 104 is configured to receive a USB IN token from a standard USB host 102 coupled to the USB extension 104, return Negative-Acknowledgment (NAK) to the standard USB host 102, transmit the USB IN token over the lossy channel 106 to the another USB extension 108, and switch the state machine 202 to its second state.

The state machine 202 stays in its second state until at least one of the following occurs: (a) the packet loss inference mechanism 204 identifies loss of the USB IN token or the reply, and as a result indicates the state machine 202 to switch back to its first state; (b) the USB extension 104 receives, from the another USB extension 108, data packet without error, in reply to the USB IN token, and as a result switches the state machine 202 to its third state; or (c) another appropriate criterion.

While the state machine 202 is in its second state, the USB extension 104 may return NAK to additional USB IN tokens received from the standard USB host 102, and not transmit the additional USB IN tokens over the lossy channel 106 to the another USB extension 108.

While the state machine 202 is in its third state, the USB extension 104 is configured to receive a new USB IN token from the standard USB host 102, return the data packet to the standard USB host 102 as reply to the new USB IN token, and switch the state machine 202 back to its first state.

The packet loss inference mechanism 204 may identify the loss of the USB IN token or the reply in various ways. In one example, the packet loss inference mechanism 204 monitors how long of the state machine 202 is in the second state, and identifies the loss of the USB IN token or the reply after determining that the state machine 202 is in the second state for at least a predetermined duration. In another example, the packet loss inference mechanism 204 counts the number of received USB IN tokens while the state machine 202 is in the second state, and identifies the loss of the USB IN token or the reply after counting a predetermined number of received USB IN tokens while the state machine 202 is in the second state. In still another example, the packet loss inference mechanism 204 is configured to identify the loss of the USB IN token or the reply based on receiving an indication from another USB extension that the USB IN token was lost. Optionally, the indication from the other USB extension that the USB IN token was lost includes a STALL packet. Optionally, the other USB extension is the another USB extension 108.

In one embodiment, the USB IN token is part of a USB bulk transaction. In another embodiment, the USB IN token is part of a USB control transaction. In still another embodiment, the USB IN token is part of a USB interrupt transaction.

Figure 3:
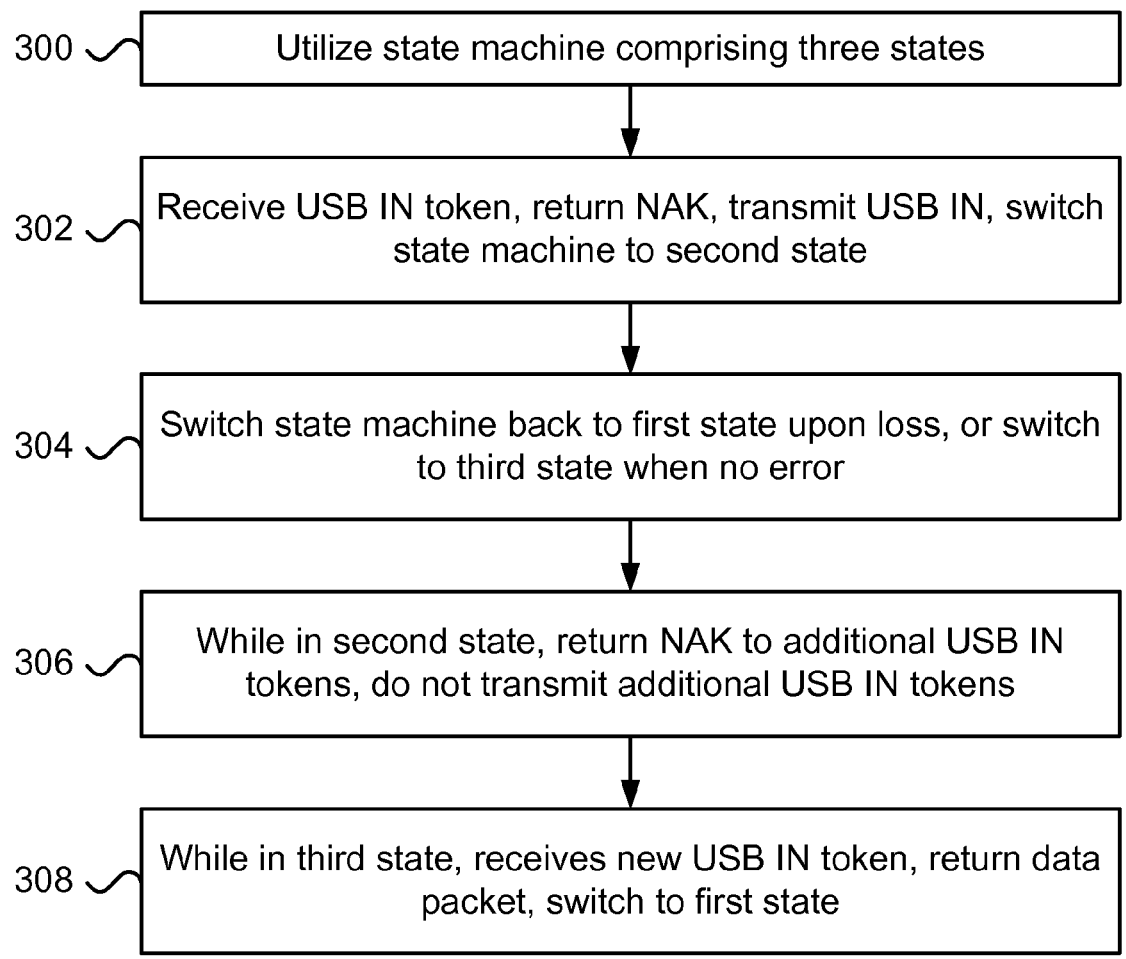
FIG. 3 illustrates a method for operating a USB extension over a lossy channel.

FIG. 3 illustrates a method for operating a USB extension over a lossy channel, including the following steps: In step 300, utilizing a state machine comprising first, second and third states for the USB extension. In step 302, when the state machine is in its first state, receiving a USB IN token from a standard USB host coupled to the USB extension, returning Negative-Acknowledgment (NAK) to the standard USB host, transmitting the USB IN token over the lossy channel to another USB extension, and switching the state machine to its second state. In step 304, retaining the state machine in its second state until at least one of the following occurs: (a) identifying loss of the USB IN token or loss of reply to the USB IN token, and as a result switching the state machine back to its first state, or (b) receiving, from the another USB extension, data packet without error, in reply to the USB IN token, and as a result switching the state machine to its third state. In step 306, while the state machine is in its second state, the USB extension returning NAK to additional USB IN tokens received from the standard USB host, and not transmitting the additional USB IN tokens over the lossy channel to the another USB extension. And in step 308, while the state machine is in its third state, the USB extension receives a new USB IN token from the standard USB host, returning the data packet to the standard USB host as reply to the new USB IN token, and switching the state machine back to its first state.

The loss of the USB IN token or the reply may be identified in various ways. In one example, the method may further include the step of monitoring how long the state machine is in the second state, and identifying the loss of the USB IN token or the reply after determining that the state machine is in the second state for at least a predetermined duration. In another example, the method may further include the step of counting number of received USB IN tokens while the state machine is in the second state, and identifying the loss of the USB IN token or the reply after counting a predetermined number of received USB IN tokens while the state machine is in the second state. In still another example, the method may further include the step of identifying the loss of the USB IN token or the reply based on receiving an indication from another USB extension that the USB IN token was lost. Optionally, the indication from the other USB extension that the USB IN token was lost includes a stall packet.

In one embodiment, the USB IN token is part of a USB bulk transaction. In another embodiment, the USB IN token is part of a USB control transaction. In still another embodiment, the USB IN token is part of a USB interrupt transaction.

Figure 4:
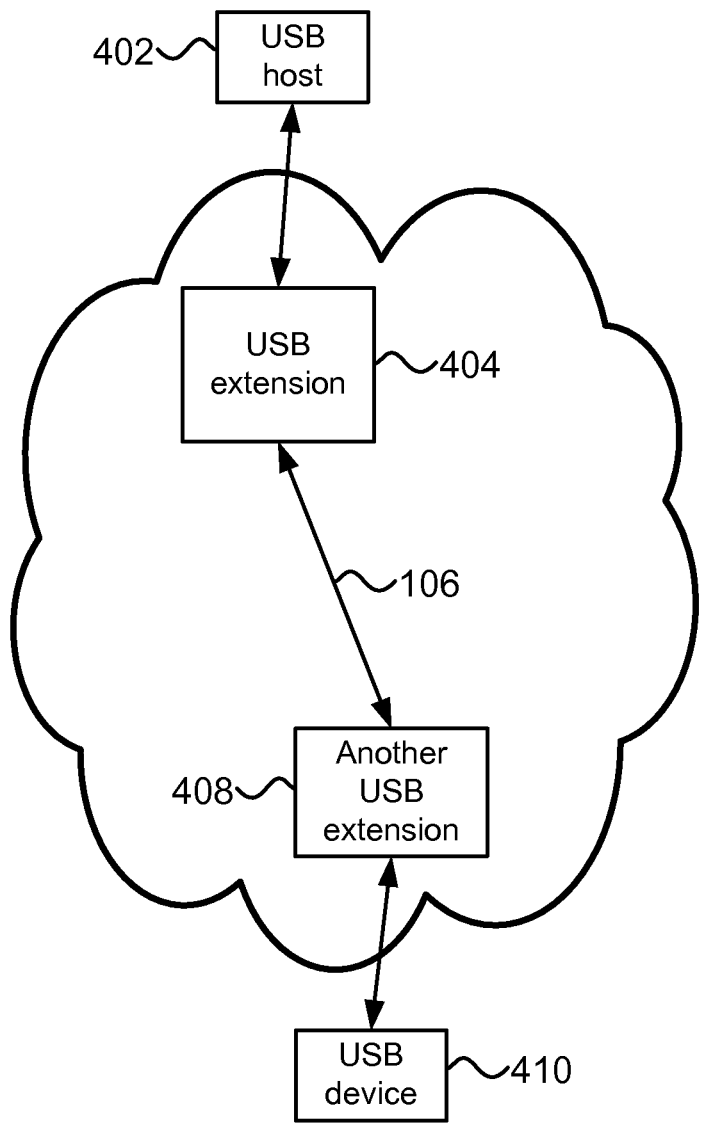
FIG. 4 illustrates one embodiment of a USB extension designed for a lossy channel.
Figure 5:
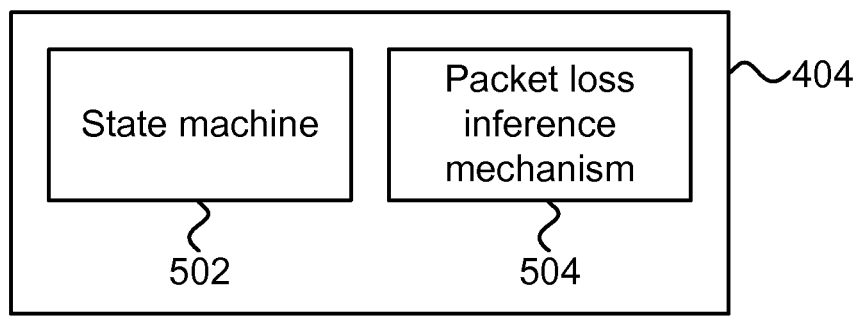
FIG. 5 illustrates one embodiment of a USB extension designed for a lossy channel.

FIG. 4 and FIG. 5 illustrate one embodiment of a USB extension designed for a lossy channel. The USB extension 404 communicates with another USB extension 408 over the lossy channel 106. The USB extension 404 includes at least a state machine 502 and packet loss inference mechanism 504.

The state machine 502 includes first, second and third states for the USB extension 404.

The packet loss inference mechanism 504 identifies loss of at least one of a USB data packet, and a reply to the USB data packet. The packet loss inference mechanism 504 is capable of indicating the state machine 502 to switch to its first state.

When the state machine 502 is in its first state, the USB extension 404 is configured to receive a USB data packet from a standard USB host 402 coupled to the USB extension 404, return Negative-Acknowledgment (NAK) to the standard USB host 402, transmit the USB data packet over the lossy channel 106 to another USB extension 408, and switch the state machine 502 to its second state.

The state machine 502 stays in its second state until at least one of the following occurs: (a) the packet loss inference mechanism 504 identifies loss of the USB data packet or the reply, and as a result indicates the state machine 502 to switch back to its first state, or (b) the USB extension 404 receives, from the another USB extension 408, a USB handshake packet in reply to the USB data packet, and as a result switches the state machine 502 to its third state.

While the state machine 502 is in its second state, the USB extension 404 may return NAK to USB data packets received from the standard USB host 402, and not transmit the USB data packets over the lossy channel 106 to the another USB extension 408.

While the state machine 502 is in its third state, the USB extension 404 is configured to receive a new USB data packet from the standard USB host 402, return the USB handshake packet to the standard USB host 402 as reply to the new USB data packet, and switch the state machine 502 back to its first state.

The packet loss inference mechanism 504 may identify the loss of the USB data packet or the reply in various ways. In one example, the packet loss inference mechanism 504 monitors how long the state machine 502 is in the second state, and identifies the loss of the USB data packet or the reply after determining that the state machine is in the second state for at least a predetermined duration. In another example, the packet loss inference mechanism 504 is configured to count number of received USB packets while in the state machine 502 is in the second state, and to identify the loss of the USB data packet or the reply after counting a predetermined number of received USB data packets while the state machine 502 is in the second state. In still another example, the packet loss inference mechanism 504 is configured to identify the loss of the USB data packet or the reply based on receiving an indication from another USB extension that the USB data packet was lost. Optionally, the other USB extension is the another USB extension 408.

In one embodiment, the USB handshake packet is selected from at least one of the following USB packets: ACK, NAK, STALL, and NYET.

In one embodiment, the first state belongs to USB High Speed Bulk OUT Transaction, the USB extension receives from other USB extension ACK that indicate that the another USB extension is prepared to accept a further packet, and the USB extension forwards to the standard USB host NYET instead of the ACK. Optionally, the USB extension forwards to the standard USB host NYET instead of the ACK in order to cause the USB host to send PING before sending the next data packet.

In one embodiment, the first state belongs to USB High Speed Bulk OUT Transaction, the USB extension receives from other USB extension NYET that indicate that the another USB extension received the data correctly but is not yet ready to accept further data, and the USB extension forwards to the standard USB host AKC instead of the NYET. Optionally, the USB extension forwards to the standard USB host AKC instead of the NYET in order to receive further data. Optionally, the other USB extension may or may not be the another USB extension.

Figure 6:
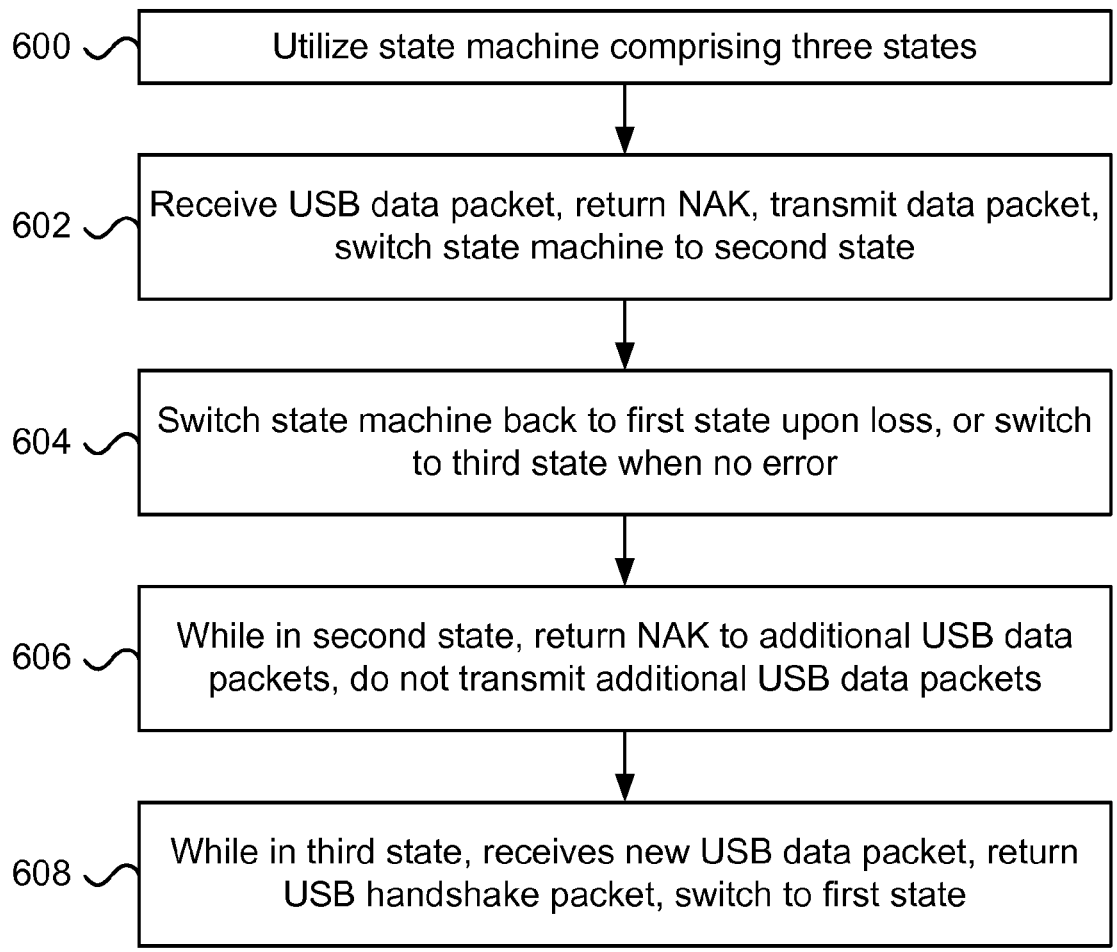
FIG. 6 illustrates a method for operating a USB extension over a lossy channel.

FIG. 6 illustrates a method for operating a USB extension over a lossy channel, including the following steps: In step 600, utilizing a state machine comprising first, second and third states for the USB extension. In step 602, when the state machine is in its first state, receiving a USB data packet from a standard USB host coupled to the USB extension, returning Negative-Acknowledgment (NAK) to the standard USB host, transmitting the USB data packet over the lossy channel to another USB extension, and switching the state machine to its second state. In step 604, retaining the state machine in its second state until at least one of the following occurs: (a) identifying loss of the USB data packet or loss of reply to the USB data packet, and as a result switching the state machine back to its first state, or (b) receiving, from the another USB extension, a USB handshake packet in reply to the USB data packet, and as a result switching the state machine to its third state. In step 606, while the state machine is in its second state, the USB extension is returning NAK to USB data packets received from the standard USB host, and not transmitting the USB data packets over the lossy channel to the another USB extension. And in step 608, while the state machine is in its third state, the USB extension receives a new USB data packet from the standard USB host, returning the USB handshake packet to the standard USB host as reply to the new USB data packet, and switching the state machine back to its first state.

The loss of the USB data packet or the reply may be identified in various ways. In one example, the method may further include the step of monitoring how long the state machine is in the second state, and identifying the loss of the USB data packet or the reply after determining that the state machine is in the second state for at least a predetermined duration. In another example, the method may further include the step of counting the number of received USB packets while the state machine is in the second state, and identifying the loss of the USB data packet or the reply after counting a predetermined number of received USB data packets while the state machine is in the second state. In still another example, the method may further include the step of identifying the loss of the USB data packet or the reply based on receiving an indication from the other USB extension that the USB data packet was lost.

Herein, a predetermined value, such as a predetermined duration or a predetermined number, is a fixed value and/or a value determined any time before performing a calculation that compares a certain value with the predetermined value. A value is also considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A Universal Serial Bus (USB) extension designed for a lossy channel, comprising:
   a state machine comprising first, second and third states for the USB extension;
   a packet loss inference mechanism configured to identify loss of at least one of a USB IN token, and a reply to the USB IN token; wherein the lossy channel is characterized by a packet loss ratio higher than zero, and the packet loss inference mechanism is capable of indicating the state machine to switch to the first state;
   when the state machine is in its first state, the USB extension is configured to receive a USB IN token from a standard USB host coupled to the USB extension, return Negative-Acknowledgment (NAK) to the standard USB host, transmit the USB IN token over the lossy channel to another USB extension, and switch the state machine to its second state;
   the state machine is configured to stay in its second state until at least one of the following occurs: (a) the packet loss inference mechanism identifies loss of the USB IN token or the reply, and as a result indicates the state machine to switch back to its first state, or (b) the USB extension receives, from the another USB extension, data packet without error, in reply to the USB IN token, and as a result switches the state machine to its third state;
   while the state machine is in its second state, the USB extension is further configured to return NAK to additional USB IN tokens received from the standard USB host, and not transmit the additional USB IN tokens over the lossy channel to the another USB extension; and
   while the state machine is in its third state, the USB extension is configured to receive a new USB IN token from the standard USB host, return the data packet to the standard USB host as reply to the new USB IN token, and switch the state machine back to its first state.

2. The USB extension of claim 1, wherein the packet loss inference mechanism is configured to monitor how long the state machine in the second state, and to identify the loss of the USB IN token or the reply after determining that the state machine is in the second state for at least a predetermined duration.

3. The USB extension of claim 1, wherein the packet loss inference mechanism is configured to count number of received USB IN tokens while the state machine is in the second state, and to identify the loss of the USB IN token or the reply after counting a predetermined number of received USB IN tokens while the state machine is in the second state.

4. The USB extension of claim 1, wherein the packet loss inference mechanism is configured to identify the loss of the USB IN token or the reply based on receiving an indication from other USB extension that the USB IN token was lost.

5. The USB extension of claim 4, wherein the indication from the other USB extension that the USB IN token was lost comprises a stall packet.

6. The USB extension of claim 1, wherein the USB IN token is part of a USB bulk transaction.

7. The USB extension of claim 1, wherein the USB IN token is part of a USB control transaction.

8. The USB extension of claim 1, wherein the USB IN token is part of a USB interrupt transaction.

9. A method for operating a Universal Serial Bus (USB) extension over a lossy channel, comprising:
utilizing a state machine comprising first, second and third states for the USB extension;
when the state machine is in its first state, receiving a USB IN token from a standard USB host coupled to the USB extension, returning Negative-Acknowledgment (NAK) to the standard USB host, transmitting the USB IN token over the lossy channel to another USB extension, and switching the state machine to its second state;
retaining the state machine in its second state until at least one of the following occurs: (a) identifying loss of the USB IN token or loss of reply to the USB IN token, and as a result switching the state machine back to its first state, or (b) receiving, from the another USB extension, data packet without error, in reply to the USB IN token, and as a result switching the state machine to its third state;
while the state machine is in its second state, the USB extension returning NAK to additional USB IN tokens received from the standard USB host, and not transmitting the additional USB IN tokens over the lossy channel to the another USB extension; and
while the state machine is in its third state, the USB extension receives a new USB IN token from the standard USB host, returning the data packet to the standard USB host as reply to the new USB IN token, and switching the state machine back to its first state.

10. The method of claim 9, further comprising monitoring how long the state machine is in the second state, and identifying the loss of the USB IN token or the reply after determining that the state machine is in the second state for at least a predetermined duration.

11. The method of claim 9, further comprising counting number of received USB IN tokens while the state machine is in the second state, and identifying the loss of the USB IN token or the reply after counting a predetermined number of received USB IN tokens while the state machine is in the second state.

12. The method of claim 9, further comprising identifying the loss of the USB IN token or the reply based on receiving an indication from other USB extension that the USB IN token was lost.

13. The method of claim 9, wherein the USB IN token is part of a USB bulk transaction.

14. The method of claim 9, wherein the USB IN token is part of a USB control transaction.

15. The method of claim 9, wherein the USB IN token is part of a USB interrupt transaction.

16. The method of claim 12, wherein the indication from the other USB extension that the USB IN token was lost comprises a stall packet.

17. A Universal Serial Bus (USB) extension designed for a lossy channel, comprising:
a state machine comprising first, second and third states for the USB extension;
a packet loss inference mechanism configured to identify loss of at least one of a USB data packet, and a reply to the USB data packet; wherein the lossy channel is characterized by a packet loss ratio higher than zero, and the packet loss inference mechanism is capable of indicating the state machine to switch to its first state;
when the state machine is in its first state, the USB extension is configured to receive a USB data packet from a standard USB host coupled to the USB extension, return Negative-Acknowledgment (NAK) to the standard USB host, transmit the USB data packet over the lossy channel to another USB extension, and switch the state machine to its second state;
the state machine is configured to stay in its second state until at least one of the following occurs: (a) the packet loss inference mechanism identifies loss of the USB data packet or the reply, and as a result indicates the state machine to switch back to its first state, or (b) the USB extension receives, from the another USB extension, a USB handshake packet in reply to the USB data packet, and as a result switches the state machine to its third state;
while the state machine is in its second state, the USB extension is further configured to return NAK to USB data packets received from the standard USB host, and not transmit the USB data packets over the lossy channel to the another USB extension; and
while the state machine is in its third state, the USB extension is configured to receive a new USB data packet from the standard USB host, return the USB handshake packet to the standard USB host as reply to the new USB data packet, and switch the state machine back to its first state.

18. The USB extension of claim 17, wherein the packet loss inference mechanism is configured to monitor how long the state machine is in the second state, and to identify the loss of the USB data packet or the reply after determining that the state machine is in the second state for at least a predetermined duration.

19. The USB extension of claim 17, wherein the packet loss inference mechanism is configured to count number of received USB packets while in the state machine is in the second state, and to identify the loss of the USB data packet or the reply after counting a predetermined number of received USB data packets while the state machine is in the second state.

20. The USB extension of claim 17, wherein the packet loss inference mechanism is configured to identify the loss of the USB data packet or the reply based on receiving an indication from other USB extension that the USB data packet was lost.

21. The USB extension of claim 17, wherein the USB handshake packet is selected from at least one of the following USB packets: ACK, NAK, STALL, and NYET.

22. The USB extension of claim 17, wherein the first state belongs to USB High Speed Bulk OUT Transaction, the USB extension receives from other USB extension ACK that indicate that the another USB extension is prepared to accept a further packet, and the USB extension forwards to the standard USB host NYET instead of the ACK.

23. The USB extension of claim 17, wherein the first state belongs to USB High Speed Bulk OUT Transaction, the USB extension receives from other USB extension NYET that indicate that the another USB extension received the data correctly but is not yet ready to accept further data, and the USB extension forwards to the standard USB host AKC instead of the NYET.

24. A method for operating a Universal Serial Bus (USB) extension over a lossy channel, comprising:
  utilizing a state machine comprising first, second and third states for the USB extension;
  when the state machine is in its first state, receiving a USB data packet from a standard USB host coupled to the USB extension, returning Negative-Acknowledgment (NAK) to the standard USB host, transmitting the USB data packet over the lossy channel to another USB extension, and switching the state machine to its second state;
  retaining the state machine in its second state until at least one of the following occurs: (a) identifying loss of the USB data packet or loss of reply to the USB data packet, and as a result switching the state machine back to its first state, or (b) receiving, from the another USB extension, a USB handshake packet in reply to the USB data packet, and as a result switching the state machine to its third state;
  while the state machine is in its second state, the USB extension is returning NAK to USB data packets received from the standard USB host, and not transmitting the USB data packets over the lossy channel to the another USB extension; and
  while the state machine is in its third state, the USB extension receives a new USB data packet from the standard USB host, returning the USB handshake packet to the standard USB host as reply to the new USB data packet, and switching the state machine back to its first state.

25. The method of claim 24, further comprising monitoring how long the state machine is in the second state, and identifying the loss of the USB data packet or the reply after determining that the state machine is in the second state for at least a predetermined duration.

26. The method of claim 24, further comprising counting number of received USB packets while the state machine is in the second state, and identifying the loss of the USB data packet or the reply after counting a predetermined number of received USB data packets while the state machine is in the second state.

27. The method of claim 24, further comprising identifying the loss of the USB data packet or the reply based on receiving an indication from other USB extension that the USB data packet was lost.

* * * * *